United States Patent [19]

Kuzma et al.

[11] Patent Number: 4,983,695

[45] Date of Patent: Jan. 8, 1991

[54] MOLECULAR WEIGHT CONTROL OF POLYBUTADIENE

[75] Inventors: Leonard J. Kuzma, Copley; Kenneth F. Castner, Uniontown, both of Ohio

[73] Assignee: The Goodyear Tire & Rubber Company, Akron, Ohio

[21] Appl. No.: 461,949

[22] Filed: Jan. 8, 1990

Related U.S. Application Data

[63] Continuation of Ser. No. 902,249, Aug. 29, 1986, abandoned, which is a continuation of Ser. No. 371,842, Apr. 26, 1982, abandoned.

[51] Int. Cl.$^5$ .......................... C08F 2/40; C08F 36/06
[52] U.S. Cl. .................................... 526/142; 526/137; 526/340.4; 526/903
[58] Field of Search ................................ 526/137, 142

[56] References Cited

U.S. PATENT DOCUMENTS

| | | | |
|---|---|---|---|
| 3,066,128 | 11/1962 | Youngman | 260/94.3 |
| 3,068,217 | 12/1962 | Higgins et al. | 260/94.3 |
| 3,856,764 | 12/1974 | Throckmorton et al. | 260/82.1 |
| 3,910,869 | 10/1975 | Throckmorton | 260/94.3 |
| 3,962,375 | 6/1976 | Throckmorton et al. | 526/335 |

FOREIGN PATENT DOCUMENTS 71834 11/1959 Brazil.
926036 11/1959 United Kingdom.

OTHER PUBLICATIONS

Ryozo Sakata et al., "Effect of Unsaturated Hydrocarbons on the Polymerization of Butadiene with Nickel Catalyst", Die Makromolekulare Chemie 139 (1970), pp. 73–81.

*Primary Examiner*—Edward J. Smith
*Attorney, Agent, or Firm*—Alvin T. Rockhill

[57] ABSTRACT

A process for the regulation of the molecular weight of a high cis 1,4-polybutadiene prepared by polymerizing 1,3-butadiene in a solution of an aliphatic and/or cycloaliphatic solvent system employing as a catalyst system a mixture of (1) an organonickel compound, (2) an organoaluminim compound and (3) a fluorine containing compound selected from the group consisting of hydrogen fluoride and hydrogen fluoride complexes prepared by complexing hydrogen fluoride with ketones, esters, ethers, alcohols, phenols and water, said polymerization being conducted in the presence of small amounts of alpha olefins such as ethylene and propylene.

10 Claims, No Drawings

MOLECULAR WEIGHT CONTROL OF POLYBUTADIENE

This is a continuation of application Ser. No. 902,249, filed on Aug. 29, 1986, now abandoned, which is a continuation of application Ser. No. 371,842, filed on Apr. 26, 1982 (now abandoned).

TECHNICAL FIELD

This invention relates to the regulation of the molecular weight of a high cis-1,4-polybutadiene which has been prepared by polymerizing 1,3-butadiene by means of a catalyst system comprising an aluminum alkyl, soluble nickel salts and a third component which contains fluorine. The third component which contains fluorine should be hydrogen fluoride or hydrogen fluoride complex prepared by reacting hydrogen fluoride with a complexing agent.

BACKGROUND OF THE INVENTION

Butadiene-1,3 has been polymerized to form high cis1,4-polybutadiene employing organonickel-based catalyst systems and as cocatalyst systems aluminum alkyl compounds and hydrogen fluoride or a hydrogen fluoride complex.

For instance, in the U.S. Pat. No. 3,856,764 issued Dec. 24, 1974, there is disclosed a process for producing high cis-1,4-polybutadiene which comprises contacting 1,3-butadiene with a catalyst consisting of (1) at least one organoaluminum compound, (2) at least one nickel compound selected from the class consisting of nickel salts of carboxylic acids, organic complex compounds of nickel and nickel tetracarbonyl, and (3) at least one hydrogen fluoride complex prepared by complexing hydrogen fluoride with one or more members of a class consisting of ketones, esters, ethers, alcohols, nitriles and water.

In U.S. Pat. No. 3,910,869 issued Oct. 7, 1975, there is disclosed another process for the polymerization of 1,3-butadiene to form polymers containing a high proportion of the butadiene units in the cis-1,4-configuration. This process comprises 1,3-butadiene under solution polymerization conditions with a catalyst comprising (1) an organoaluminum compound, (2) an organ nickel compound and (3) hydrogen fluoride.

In the process of all of the aforementioned patents 1,3-butadiene is polymerized to a high cis-1,4-configuration polybutadiene of fairly high molecular weight in the neighborhood of 3.0 or greater than 3 DSV (dilute solution viscosity).

There are other United States patents which might be mentioned as producing a high cis 1,4-polybutadiene, such as U.S. Pat. No. 3,170,907 issued Feb, 23, 1965.

There are other patents which utilize aluminum alkyls organonickel compounds and fluorine containing compounds to produce polybutadienes having various molecular weights and physical properties. See U.S. Pat. No. 3,725,492 issued Apr. 3, 1969.

In many applications of which cis-1,4-polybutadiene can be employed, it is usually desirable to employ a lower molecular weight polymer than those generally obtained from either one of the immediately aforementioned polymerization systems. For example, in the manufacture of tires, particularly automobile tires, it is usually desired to use a high cis-1,4-polybutadiene having a DSV of about 3 or slightly higher. On the other hand, if one desires to use the high cis-1,4-polybutadiene as a sealant or in a paint or some other application other than tires it is usually desirable to have a polybutadiene with a DSV of something less than 3, even to a liquid.

The process of the invention described herein deals with the use of various hydrocarbon compounds to regulate the molecular weight of the above-mentioned polymerization systems. The utilization of these molecular weight regulators expands the scope of the organoaluminum/organonickel/fluorine catalyzed 1,3-butadiene polymerization systems in a manner that the molecular weight of the cis-1,4-polybutadiene can be controlled from an extremely high molecular weight elastomer all the way down to a liquid polymer.

In the prior art there are syntheses of various molecular weight polybutadienes which can be produced by an anionic or an emulsion polymerization system by controlling the mechanism of the catalyst, the catalyst level or the chain transfer level, respectively. However, these polymerization systems do not necessarily yield a high cis-1,4-polybutadiene typical of the aluminum/nickel/fluorine-base solution polymerization systems mentioned above. As an example, in a typical alkyllithium initiated system, which is anionic in nature, the 1,3-butadiene is polymerized generally yielding about 36 to 45 weight percent cis-1,4-polymer, about 48 to 50 percent trans-1,4-polymer and about 8 to 10 percent of the 1,2-structure. Butadiene 1-3 has been polymerized in typical emulsion polymerization systems. These emulsion polymerization systems usually result in the polybutadiene having about 60 percent of the product in the trans-1,4-configuration, about 20 percent in the cis-1,4-structure and about 20 percent in the 1,2-structure.

Very low molecular weight polybutadienes have been synthesized using nickel compounds and aluminum halide compounds in solution polymerization systems. However, these catalyst systems do not yield a very high cis1,4-structure in the polybutadiene which is typical of the nickel carboxylate/organoaluminum/fluorine containing systems. They furthermore do not have the flexibility to yield high molecular weight polymers.

The uniqueness of the present invention is that it expands the scope of the high cis-1,4directing 1,3-butadiene polymerization systems such that they can be employed for the synthesis of the polymers ranging from an elastomer useful in the production of automobile tires to an oily liquid useful in coatings and in other less demanding applications.

The effect of certain hydrocarbon compounds on the polymer intrinsic viscosity ($\eta$) in 1,3-butadiene polymerization systems employing nickel-based catalyst systems was studied by Sakata et al, and reported in *Die Makromolekulare Chemie,* 139 (1970), pages 73–81. In these studies the authors employed a triethylaluminum/nickel carboxylate/boron trifluoride etherate catalyst system in benzene solvent. The hydrocarbons screened in this study included saturated hydrocarbons, such as propane, n-butane and isobutane. Alpha olefins, such as propylene, butene-1 and isobutene were studied, as well as internal olefins, such as cis and trans butene-2. Concerted diolefins, such as allene and 1,2-butadiene were tried as hydrocarbons to reduce the molecular weight. Further acetylenes such as methylacetylene, and vinylacetylene, and nonconjugated diolefins, such as 4-vinylcyclohexene-1 were attempted to be used as molecular weight regulators. The authors of this aper concluded that saturated hydrocarbons and mono-olefins, such as alpha olefins and internal olefins show no effect on the polymer viscosity nor on the conversion. Further, they found that 4-vinylcyclohexene has the effect of lowering the polymer viscosity, however, in order to do so required such amounts as to preclude its employment as a useful molecular weight regulator. The acetylenes did not lower the molecular weight but they did have a very dramatic detrimental effect on polymer yields.

SUMMARY OF THE INVENTION

The description of the catalyst system employed in the process of this invention which is (1) an organoaluminum compound, (2) an organonickel compound and (3) a fluorine-bearing compound selected from the group consisting of hydrogen fluoride and hydrogen fluoride complexes. The catalyst system will be discussed in greater detail further in this disclosure.

The invention comprises a process for the regulation of the molecular weight of a high cis-1,4-polybutadiene prepared by polymerizing 1,3-butadiene in a solution of an aliphatic and/or cycloaliphatic solvent system employing as a catalyst system a mixture of (1) an organonickel compound, (2) an organoaluminum compound and (3) fluorine containing compound selected from the group consisting of hydrogen fluoride and hydrogen fluoride complexes prepared by complexing hydrogen fluoride with ketones, esters, ethers, alcohols, phenols and water, said polymerization being conducted in the presence of small amounts of alpha olefins such as ethylene and propylene.

DETAILED DESCRIPTION

By the term "organoaluminum compound" is meant that any organoaluminum compound responding to the formula

in which $R_1$ is selected from the group consisting of alkyl (including cycloalkyl), aryl, alkylaryl, arylalkyl, alkoxy and hydrogen; $R_2$ and $R_3$ being selected from the group of alkyl (including cycloalkyl) aryl, alkylaryl, and arylalkyl. Representative, but not limiting of the compounds responding to the formula set forth above, are diethylaluminum hydrides, di-n-propylaluminum hydrides, di-n-butylaluminum hydrides, diisobutylaluminum hydrides, diphenylaluminum hydrides, di-p-tolylaluminumhydrides, dibenzylaluminum hydrides, phenylethylaluminum hydrides, phenyl-n-propylaluminum hydrides, p-tolylethylaluminum hydrides, p-tolyl-npropylaluminum hydrides, p-tolyliso-propylaluminum hydrides, benzylethylaluminum hydrides, benzyl-npropylaluminum hydrides, benzyl-isopropylaluminum hydrides, and other organoaluminum hydrides. Included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyldi-p-tolylaluminum, ethyldibenzylaluminum, diethylphenylaluminum, diethylptolylaluminum, diethylbenzylaluminum and other organoaluminum compounds. Also included are diethylaluminum ethoxide, diisobutylaluminum ethoxide and dipropylaluminum methoxide.

The component of the catalyst of this invention which contains nickel may be any organonickel compound. It is preferred to employ a soluble compound of nickel. Thus, the nickel salts of carboxylic acids and the organic complex compounds of nickel are suitable. These soluble nickel compounds are normally compounds of nickel with mono or bidentate organic ligands containing up to 20 carbon atoms. "Ligand" is defined as an ion or a molecule bound to and considered bonded to a metal atom or ion. "Monodentate" means having one position to which covalence or coordinate bonds with the metal may be formed; "bidentate" means having two positions to which covalence or coordinate bonds to the metal may be formed. By the term "soluble" is meant soluble in the inert solvents utilized in the solution polymerization system. Thus, any salt or organic acid containing from about 1 to about 20 carbon atoms may be employed. Representative, but not exhaustive, of the organonickel compounds are nickel benzoate, nickel acetate, nickel naphthenate, nickel octanoate, bis(α-furyldioxine) nickel, nickel palmitate, nickel stearate, nickel acetylacetonate, nickel salicaldehyde, bis(salicaldehyde)ethylene diamine nickel, bis(cyclopentadienyl)nickel, cyclopentadienyl nickel nitrosyl and nickel tetra carbonyl. The preferred component containing nickel is a nickel salt of a carboxylic acid or an organic complex compound of nickel.

Another component of the catalyst system employed in this invention is a fluorine containing compound. The fluorine may be supplied by hydrogen fluoride, or by hydrogen fluoride being complexed with a member of the class consisting of mono-hydric alcohols, phenols, water, mineral acids containing oxygen, aldehydes, esters, ethers, ketones and nitriles.

The ketone subclass which can be complexed with the hydrogen fluoride can be defined by the formula: R'COR wherein R' and R represent an alkyl, cycloalkyl, aryl and alkylaryl and arylalkyl radical containing from 1 to 30 carbon atoms; R' and R may be the same or dissimilar radicals. These ketones represent a class of compounds which have a carbon atom attached by double bond to oxygen. Representative but not exhaustive of the ketones useful in the preparation of the hydrogen fluoride complexes of this invention are acetone, methl ethyl ketone, dibutyl ketone, methyl isobutyl ketone, ethyl octyl ketone, 2,4-pentanedione, butylcycloheptanone, acetophenone, amyl phenyl ketone, butyl phenyl ketone, benzophenone, phenyl tolyl ketone, and the like. The preferred complexes of the ketones are hydrogen fluoride.acetophenone and hydrogen fluoride.benzophenone and hydrogen fluoride acetone.

The aldehyde subclass can be defined by the formula RCHO where R represents an alkyl, cycloalkyl, aryl, alkylaryl, and arylalkyl radicals containing from 1 to 30 carbon atoms. The aldehydes have a carbon attached to an oxygen atom by means of a double bond. Representative but not exhaustive of the aldehydes are butyraldehyde, anisaldehyde, cinnamic aldehyde, isobutylaldehyde, heptaldehyde, dodecylaldehyde, benzaldehyde, phenylacetaldehyde, tolualdehyde, m-nitrobenzaldehyde, p-nitrobenzaldehyde, m-hydrobenzaldehyde and the like. The preferred hydrogen fluoride complexes formed from the aldehydes are hydrogen fluoride benzaldehyde, and hydrogen fluoride tolualdehyde.

The ester subclass which can be complexed with the hydrogen fluoride in this invention can be represented by the formula R'—COOR, wherein R' and R are represented by alkyl, cycloalkyls, aryl, alkylaryl, and arylalkyl radicals containing of from 1 to 30 carbon atoms. These esters contain a carbon atom attached by a double bond to an oxygen atom. Representative but not exhaustive of the esters are ethyl butyrate, ethyl octanoate, isopropyl hexanoate, amyl acetate, hexyl propionate, cetyl acetate, ethyl benzoate, amyl benzoate, phenyl acetate, phenyl butyrate, phenyl benzoate, and the like. The preferred complexes of the HF with the esters are hydrogen fluoride.ethyl benzoate and hydrogen fluoride. phenyl acetate.

The nitrile subclass can be represented by the formula RCN, wherein R represents an alkyl, cycloalkyl, aryl, alkylaryl, and arylalkyl. The nitriles contain a carbon atom attached to a nitrogen atom by a triple bond. Representative but not exhaustive of the nitrile subclass which can be employed to complex the hydrogen fluoride are acetonitrile, butyronitrile, acryonitrile, benzonitrile, tolunitrile, phenylacetonitrile and the like. The preferred complex prepared from the nitriles and HF in this application is hydrogen fluoride.benzonitrile.

The monohydric alcohols subgroup of the class of compounds which are alcohols can be portrayed as ROH wherein R represents an alkyl, cycloalkyl, aryl and arylalkyl radicals containing from 1 to 30 carbon atoms. Representative but not exhaustive of the alcohols are methanol, ethanol, n-propanol, isopropanol, n-butanol, benzylalcohol, and the like. The preferred complexes are as follows: HF.methanol, HF.butanol, HF.isobutanol, and other alcohol complexes of hydrogen fluoride. The ether subclass which can be complexed with the hydrogen fluoride employed in the present invention can be defined by the formula: ROR', wherein R and R' represent an alkyl, a cycloalkyl, aryl, alkylaryl and arylalkyl containing from 1 to 30 carbon atoms; R and R' may be the same or dissimilar radicals. Representative but not exhaustive of such ethers are dimethylether, diethyl ether, dibutylether, anisole, diphenylether, dicyclohexylether, and the like. The preferred complexes of the ether complex with either hydrogen fluoride are hydrogen fluoride dibutyl etherate, hydrogen fluoride.diphenyl etherate, and the like.

The phenol subgroup of the classes of compounds can be portrayed as $\phi$—OH wherein $\phi$ represents the phenyl group. Representative but not exhaustive of the phenol group are phenols, p-cresol, resorcinol, napthol, hydroquinone and the like. The preferred complexes formed from the phenol and the HF are HF.p-cresol and HF.phenol.

A number of the members of the subgroup of mineral acids containing oxygen will complex with HF. Representative but not exhaustive of the mineral acids subgroup are phosphoric acid, sulfuric acid, nitric acid and the like. The preferred acid complexes formed from the mineral acids subgroup and HF are HF.100% phosphoric acid.

Water, although in a subgroup by itself, will form at least two hydrate complexes. These are $HF.H_2O$ and $HF.2H_2O$.

Hydrogen fluoride which can be employed alone as to fluorine producing compounds in this invention is a limpid liquid which fumes strongly in air, is very poisonous, forms ulcerated sores if it comes in contact with the skin and is very dangerous to handle and to manipulate. Some of these problems can be overcome by complexing the hydrogen fluoride with the complexing agents heretofore mentioned. Some of the advantages obtained by forming the complexes are that they are safer, easier and more accurately measured in the way of handling the hydrogen fluoride component of the catalyst system. Hydrogen fluoride usually complexes to form a complex having a lower vapor pressure, and the complex does not fume as badly as does straight hydrogen fluoride. Hydrogen fluoride boils at 19.7° C., whereas a 40 percent by weight of a hydrogen fluoride.diethylether azeotrope or complex boils at about 74° C. When the hydrogen fluoride component is complexed the corrosiveness of the hydrogen fluoride is reduced. The hydrogen fluoride complex can be dissolved in a solvent and thus can be handled and charged to the polymerization system as a liquid solution rather than charging hydrogen fluoride as a gas or a limpid liquid. The solvent which can be employed to solubilize the hydrogen fluoride complex can be any of the inert solvents used as the solvent in the solution polymerization of this invention.

The complexes of hydrogen fluoride of this invention are usually prepared by simply dissolving the appropriate amount of the complexing agent, for instance a ketone an ester, an ether, an alcohol or a phenol in a suitable solvent and adding the appropriate amount of hydrogen fluoride in a solvent or as a gas or a limpid liquid and mixing in the solvent system. The hydrogen fluoride being soluble in an inert solvent could be dissolved in a solvent separately and the two solvent systems mixed together. Another possible method would be to dissolve either the hydrogen fluoride or the complexing agent in a suitable solvent and then adding the remaining components.

Another method of mixing would be to dissolve the complexing agent in a solvent and simply bubble gaseous hydrogen fluoride through the system until the complexing agent is reacted fully with the hydrogen fluoride.

The amount of complexing agent cannot specifically be set forth. The amount of complexing agent may be a range depending on the conditions of the reaction system, the hydrogen bonding strength of the complexing agent, the size of the complexing agent, or it may be in equilibrium with the hydrogen fluoride complex and the hydrogen fluoride plus the complexing agent. Usually, the complexing agent is employed at a one to one mole ratio with the hydrogen fluoride, but it is possible to use up to 4 moles of HF to 1 mole of complexing agent or up to 4 moles of complexing agent to 1 mole of HF.

The three component catalyst system of this invention has polymerization activity over a fairly wide range of catalyst concentrations and catalyst ratios. It is believed that the three catalyst components inter react to form the active catalyst species. As a result, the optimum concentration of any catalyst component is somewhat dependent on the catalyst concentrations of the other two catalyst components. It should be appreciated that while polymerization will occur over a wide range of catalyst concentrations and ratios, polybutadiene having the most desirable properties will be obtained within a narrow range of catalyst component concentrations and ratios. Polymerization can occur when the mole ratio of the organoaluminum compounds (Al) to the nickel salts or nickel complex (Ni) ranges from about 0.3/1 to about 300/1; the mole ratio of the fluorine containing compound (F) to the organonickel compound (Ni) ranges from about 0.5/1 to about 500/1 and the mole ratio of the fluorine compound to the organoaluminum compound ranges from about 0.4/1 to about 15/1. However, a more preferred mole ratio of Al/Ni ranges from about 2/1 to about 80/1, and a preferred mole ratio of F/Ni ranges from about 3/1 to about 150/1, and the preferred mole ratio of F/Al ranges from about 1/1 to about 10/1.

The concentration or the amounts of the catalyst components which are employed in the practice of this invention depend on factors such as the purity of the polymerization system, the polymerization rate desired, the temperature employed and other factors. Therefore, specific catalyst concentrations will not be set forth except to state that catalytic amounts of each are employed in the polymerization of this invention.

In general, the polymerization of this invention is carried out in an inert solvent system which is aliphatic, cycloaliphatic or aromatic in nature. Representative examples of these solvents are pentane, hexane, cyclohexane, butane, benzene and toluene and the like. The solvent/butadiene volume ratio may be varied over a wide range, however, it is usually desired, or more convenient and economical, to use a solvent/monomer volume ratio of about 3/1 to about 6/1. This is not to say that higher or even lower solvent/ monomer volume ratios cannot be employed.

It is usually desirable to conduct the polymerizations of this invention employing air-free and moisture-free techniques.

The polymerization temperatures employed in the present invention are not critical and may vary from a very low temperature, such as −10° C. or below, up to a high temperature such as 100° C. or higher. However, it is usually more desirable to employ a more conventional temperature from about 30° C. to 90° C.

The molecular weight regulating compound is selected from the group consisting of ethylene and propylene. It has been determined that the amount of ethylene and/or propylene employed to control the molecular weight in the process of the present invention should be from 0.05 to 4.60 parts per hundred parts of butadiene employed in the polymerization system.

The practice of this invention is further illustrated by reference to the following examples which are representative rather than restrictive of the scope of the invention. Unless otherwise noted, all parts and percentages are by weight. Dilute solution viscosities (DSV) were determined by using approximately 0.25 grams of polymer dissolved in 50 ml of toluene and obtaining the viscosity at 30° C.

EXAMPLES

A premix solution of 15% by weight 1,3-butadiene in hexane was prepared and was dried, that is, trace amounts of water was removed by passing this premix through a silica gel column under a nitrogen atmosphere. Portions of 100 ml of the solution were transferred to 0.118 liter polymerization bottles under nitrogen atmosphere. These bottles were capped using a punctured cap fitted with a self-sealing gasket and a Teflon TM liner.

Separately, ethylene and propylene were passed through a silica gel/alumina column, then fed directly into a syringe which was used to inject the regulator into the polymerization bottles.

In the following examples (1 through 7), various amounts of catalyst components and various amounts of ethylene and propylene were added to each of the several bottles, using a syringe and a needle, through the self-sealing gasket.

EXAMPLE 1

In this example 0.012 grams or 0.13 parts per hundred of monomer (phm), based on the amount of butadiene in the bottle, of ethylene was injected into the bottle.

The catalyst components were then added in the order as follows: 0.40 ml of a 0.25 molar triisobutylaluminum solution in hexane. Next there was added 0.05 ml of a 0.05 molar nickel octanoate in hexane. Finally, there was added 1.05 ml of a 0.25 molar solution of hydrogen fluoride.butyl ether complex in hexane. The thus charged polymerization bottle was placed in a 65° C. water bath and rotated end-over-end for 1.5 hours. After that, the reaction was quenched by the addition of triisopropanolamine using approximately one part per 100 parts of butadiene charged. To stabilize the polybutadiene, 2,6-ditertiary-p-cresol at 1 part per one hundred parts of monomer charged was added. The polybutadiene cement was air dried to a constant weight. The polymer yield was calculated at 8.20 grams or 86% theoretical conversion. The polymer dilute solution viscosity (DSV) was determined to be 3.98 dl/g.

EXAMPLE 2

A polymerization was conducted in a manner identical to that of Example 1, except that ethylene was employed in an amount of 0.046 g or 0.48 phm. This resulted in a polymer yield of 8.08 g or 85% theoretical conversion. The polybutadiene had a DSV of 2.86 dl/g.

EXAMPLE 3

A polymerization was conducted identical to that of Example 1, except that 0.093 g or 0.98 phm of ethylene was employed. The polymer yield was 7.31 g or 77% theoretical conversion. The polybutadiene had a DSV of 2.33 dl/g.

EXAMPLE 4

A polymerization was conducted identical to that of Example 1, except that 0.174 g or 1.83 phm of ethylene was employed. A polymer yield of 5.96 g or 63% of theoretical conversion was obtained. The polybutadiene had a DSV of 1.92 dl/g.

EXAMPLE 5

An experiment identical to that of Example 1 was made, except that propylene was employed instead of ethylene in an amount of 0.069 or 0.73 phm. The polymer yield was 8.97 which is 94% of theoretical. The DSV of the polybutadiene was 4.28 dl/g.

EXAMPLE 6

A run was made identical to that of Example 1, except that propylene was employed instead of ethylene in the amount of 0.139 g. or 1.46 phm. The yield was 8.02 or 93% of theoretical was obtained. The DSV of the polybutadiene was 3.72 dl/g.

EXAMPLE 7

A run was made identical to that of Example 5, except 0.26 g. or 2.74 phm of propylene was used. The polymer yield was 7.13 g. or 75% of theoretical. The DSV was 3.37 dl/g.

EXAMPLE 8

A run was made identical to that of Example 5, except 0.434 g. or 4.57 phm of propylene was used. The polymer yield was 2.19 g, or 23% of theoretical. The DSV of the polymer was reduced to 2.96 dl/g.

While certain representative embodiments and details have been shown for the purpose of illustrating the invention, it will be apparent to those skilled in this art that various changes and modifications may be made therein without departing from the scope of the invention.

We claim:

1. A process for regulating the molecular weight of a high cis-1,4-polybutadiene prepared by polymerizing 1,3-butadiene in a solution of an aliphatic and/or cycloaliphatic solvent system employing as a catalyst system, a mixture of (1) a nickel salt of a carboxylic acid, (2) a trialkylaluminum compound, and (3) a fluorine containing compound prepared by complexing hydrogen fluoride with ethers; wherein the mole ratio of said trialkylaluminum compound to said nickel salt of a carboxylic acid ranges from about 0.3/1 to about 300/1, wherein the mole ratio of said fluorine containing compound to said nickel salt of a carboxylic acid ranges from about 0.5/1 to about 500/1, and wherein the mole ratio of the fluorine containing compound to the trialkylaluminum compound ranges from about 0.4/1 to about 15/1; said polymerization being conducted in the presence of 0.73 to 4.57 phm of propylene.

2. A process according to claim 1 in which the mole ratio of the trialkylaluminum compound/the nickel salt of a carboxylic acid ranges from about 2/1 to about 80/1, the mole ratio of the fluorine containing compound to the nickel salt of a carboxylic acid ranges from about 3/1 to about 150/1 and the mole ratio of the fluorine containing compound to the trialkylaluminum compound ranges from about 1/1 to about 10/1.

3. A process according to claim 2 in which the nickel salt of a carboxylic acid is nickel octanoate, the trialkylaluminum compound is triethylaluminum or triisobutylaluminum and the fluorine containing compound is hydrogen fluoride complexed with dibutyl ether.

4. A process according to claim 1 wherein the trialkylaluminum compound is triisobutylaluminum.

5. A process according to claim 1 wherein the propylene is present in an amount within the range of 0.73 phm to 1.46 phm.

6. A process according to claim 1 wherein the trialkylaluminum compound is selected from the group consisting of trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, and trioctylaluminum.

7. A process according to claim 1 wherein the nickel salt is selected from the group consisting of nickel benzoate, nickel acetate, nickel naphthenate, nickel octanoate, nickel palmitate, nickel stearate, and nickel acetylacetonate.

8. A process according to claim 1 wherein the fluorine containing compound is hydrogen fluoride dibutyl etherate.

9. A process according to claim 1 wherein the fluorine containing compound is hydrogen fluoride diphenyl etherate.

10. A process according to claim 1 wherein the nickel salt is nickel octanoate.

* * * * *